United States Patent
Weber (10) Patent No.: US 9,792,421 B1
(45) Date of Patent: Oct. 17, 2017

(54) SECURE STORAGE OF FINGERPRINT RELATED ELEMENTS

(71) Applicant: Fingerprint Cards AB, Göteborg (SE)

(72) Inventor: Sebastian Weber, Malmö (SE)

(73) Assignee: FINGERPRINT CARDS AB, Göteborg (SE)

( * ) Notice: Subject to any disclaimer, the term of this patent is extended or adjusted under 35 U.S.C. 154(b) by 0 days.

(21) Appl. No.: 15/471,671

(22) Filed: Mar. 28, 2017

(30) Foreign Application Priority Data

Mar. 31, 2016 (SE) ...................... 16504169

(51) Int. Cl.
*G06F 21/32* (2013.01)
*G06K 9/00* (2006.01)

(52) U.S. Cl.
CPC .......... *G06F 21/32* (2013.01); *G06K 9/00067* (2013.01); *G06K 9/00087* (2013.01)

(58) Field of Classification Search
CPC .......... G06F 21/00; G06F 21/30; G06F 21/31; G06F 21/32; H04L 29/06809; G06K 9/00006; G06K 9/00067; G06K 9/00087
See application file for complete search history.

(56) References Cited

U.S. PATENT DOCUMENTS

| | | | |
|---|---|---|---|
| 8,947,595 B1 * | 2/2015 | Tucker | H04N 21/231 348/445 |
| 9,177,190 B1 * | 11/2015 | Chou | G06K 9/00013 |
| 2002/0150282 A1 * | 10/2002 | Kinsella | G06K 9/00013 382/124 |
| 2002/0152034 A1 * | 10/2002 | Kondo | G06K 9/00 702/19 |
| 2006/0101069 A1 * | 5/2006 | Bell | G06F 17/2785 |
| 2008/0019573 A1 | 1/2008 | Baltatu et al. | |
| 2010/0092048 A1 * | 4/2010 | Pan | G06K 9/00093 382/125 |
| 2014/0241597 A1 | 8/2014 | Leite | |
| 2015/0016697 A1 | 1/2015 | Kerr | |
| 2015/0356286 A1 * | 12/2015 | Quirk | G06F 21/32 726/19 |
| 2016/0042219 A1 * | 2/2016 | Bae | G06K 9/00013 382/124 |

FOREIGN PATENT DOCUMENTS

| | | |
|---|---|---|
| EP | 1476846 A1 | 7/2007 |
| WO | 0139134 A2 | 5/2001 |
| WO | 2011078678 A1 | 6/2011 |

OTHER PUBLICATIONS

Tuyls et al. "Practical Biometric Authentication with Template Protection" [Online], 2005 [Retrieved on: Aug. 2, 2017], Philips Research Laboratories, pp. 436-446, Retrieved from: < http://www.cse.lehigh.edu/prr/Biometrics/Archive/Papers/Tuyls05.pdf >.*

(Continued)

*Primary Examiner* — Eric W Shepperd
(74) *Attorney, Agent, or Firm* — RMCK Law Group, PLC (57) ABSTRACT

The present disclosure relates to secure storage of a detailed set of elements relating to fingerprint features for a finger and to a method for authenticating a candidate fingerprint of a finger using said detailed set of elements, allowing for improved security and user convenience.

13 Claims, 7 Drawing Sheets

(56) References Cited

OTHER PUBLICATIONS

Ping Wang, Chih-Chiang Ku and Tzu Chia Wang (2011), "A New Fingerprint Authentication Scheme based on Secret-splitting for Cloud Computing Security", Recent Application in Biometrics, Dr. Jucheng Yang (Ed.), ISBN: 978-953-307-488-7, InTech, [retrieved on Nov. 30, 2016] Retreived from the Internet: <http://www.intechopen.com/books/recent-applicationinbiometrics/a-new-fingerprint-authentication-scheme-based-on-secret-splitting-for-cloud-computing-security>.

Swedish Search Report for Swedish Patent Application No. 1650416-9 dated Dec. 2, 2016, 3 pages.

* cited by examiner

SECURE STORAGE OF FINGERPRINT RELATED ELEMENTS

CROSS-REFERENCE TO RELATED APPLICATIONS

This application claims priority to Sweden Application No. 1650419-9, filed on Mar. 31, 2016, the disclosure of which is incorporated herein by reference in its entirety.

TECHNICAL FIELD

The present disclosure relates to secure storage of a detailed set of elements relating to fingerprint features for a finger and to a method for authenticating a candidate fingerprint of a finger using said detailed set of elements, allowing for improved security and user convenience.

BACKGROUND

The use of biometric techniques to identify and/or authenticate the identity of a user is increasing. Biometric techniques that are promoted for this use include voice, fingerprint, iris, vein pattern and other scans. Currently, the use of fingerprint sensors for capturing a fingerprint has shown to be specifically promising, for example due to its ease of integration with different types of electronic equipment, such as smartphones, watches, tablets, etc. The reliability achieved already by currently available electronic fingerprint systems makes them useful also in areas such as immigration, banking, payments, etc.

The general idea when using fingerprint identification/verification is to enroll a fingerprint sample from the user and thereafter compare this with a previously determined template, stored locally within e.g. the smartphone or remotely at e.g. a cloud server. If the comparison result is positive access is granted, otherwise access is denied. The template should thus be seen as a digital identification for the user, and hence if this is lost, the risk that someone abuses it is apparent. Accordingly, it is obvious that local and specifically remote template storage may be risky for a user of the fingerprint system as the damage if an unauthorized entity retrieves the template may be permanent since it is difficult to replace a finger.

In some prior-art examples, such as disclosed in US20150016697A1 being related to a cloud server implementation, the fingerprint data is suggested to be protected through encryption. However, there is an obvious risk that a third-party with enough resources will be able to decipher the fingerprint data. That is, in case the cloud server is hacked this may have serious impact on a large plurality of users having stored their fingerprint data at the cloud server. In fact, such an issue could greatly impact on the public's view of fingerprint systems.

Accordingly, as there is a desire to closely protect user related data while at the same time expanding the use of fingerprint systems due to its reliability and simplicity of use, there is a necessity to provide an alternative and more secure solution, as compared to prior art, where accordingly less risk is placed on the user.

SUMMARY

In view of the above-mentioned security problems, it is an object of the present disclosure to provide an improved method for use with an electronic fingerprint system, where the risk involved with remote storage of fingerprint related data is drastically reduced.

According to a first of the present disclosure, it is therefore provided a method of storage of a detailed set of elements relating to fingerprint features for a finger of a user by means of an electronic fingerprint arrangement comprising a fingerprint sensor and processing circuitry connected to the fingerprint sensor, wherein the method comprises the steps of acquiring, by said processing circuitry, fingerprint data of the finger using the fingerprint sensor, determining, by said processing circuitry, a first plurality of fingerprint features of the finger from the fingerprint data, dividing, by said processing circuitry, the first plurality of fingerprint features into a first basis set of features and a first detailed set of elements related to the first basis set of features, wherein the first detailed set of elements are different from the first basis set of features, and providing, by said processing circuitry, the first detailed set of elements for storage within a computer memory.

The present disclosure is based around the concept of separating details extracted from the fingerprint data into at least two categories, where the first category is arranged to include so called "basis features" for the finger and the second category comprises "detailed elements". The detailed elements are different from the basis features, however having a distinct relation to the basis features. The basis set of features typically comprises key-point features for the finger.

With an understanding of the above, the detailed elements will not be of any use for e.g. a hacker, as they are formed to be useful only when related to the basis features. Accordingly, storage of only the detailed elements and/or information relating to the detailed elements will be in comparison more secure than the prior-art approach where the complete template of the finger will be stored within a computer memory. Typically, the basis features will not be stored at all, but discarded once the process has been completed for determining the detailed elements and their relation to the basis features.

As only the detailed elements are stored within the computer memory and hence the basis features will be "carried around by the user" (i.e. being present at the finger), the basis features should be selected wisely such that a subsequent attempt to extract basis features from a second set of fingerprint data will generate essentially the same result. Thus, care must be taken to optimize the basis feature extraction algorithm such consecutive executions of the basis feature extraction algorithm on different sets of fingerprint data of the same finger will generate said comparable results. The detailed description below will provide an example of how the basis feature extraction algorithm may be implemented, as well as how the related detailed elements may be selected.

In a possible embodiment of the present disclosure the first detailed set of elements are related to the first basis set of features according to a predetermined feature transform key. Such a feature transform key may be used for defining a model of how the first basis set of features are to relate to the first detailed set of elements. In a possible embodiment information relating to the feature transform key is also stored with the computer memory, together with or related to the first detailed set of elements.

An advantage with introducing the use of the feature transform key to be used in relating the first detailed set of elements to the first basis set of features is that it will be possible to exchange the feature transform key in case the first detailed set of elements in some way would be "lost" of otherwise hacked, e.g. when stored with the computer memory. Accordingly, the use of the feature transform key will make the first detailed set of elements revocable, i.e. by disallowing any further use of the first detailed set of elements when they are related to the feature transform key. In such a case, it could for example be possible to select a "new" feature transform key (being different from the disallowed one) when performing a "new" storage of a detailed set of elements relating to fingerprint features for a finger of the user.

As understood, this use of the feature transform key may further reduce the risk of reversibility of the stored first detailed set of elements, as their relation to the (first) basis set of features may now be further "hidden". In some embodiments the feature transform key may be at least partly include a random component, for example at least partly based on a random number. However, the feature transform key may also or alternatively be selected from a predetermined list, such as from a predetermined list of numbers, possibly selected "in order" if one number would be cancelled as discussed above.

It is with noticing that the first basis set of features in some embodiments may be sees as to form a "baseline" for the user's finger. As such, the detailed set of elements may be seen as related to the baseline for the user's finger, where typically the first detailed set of elements is non-related to the first basis set of features.

In a preferred embodiment of the present disclosure, the computer memory is physically separated from the electronic fingerprint arrangement, such as comprised with a remotely located cloud server. As understood from the above, the security surrounding remotely stored data relating to a finger, as well as the upload/download of said data from e.g. the cloud server, will be greatly improved, as any third party trying to hack into the cloud server if successful only will be able to get hold of the detailed elements only being useful if also having access to the basis features. It should be understood that the detailed set of elements optionally may be stored in an encrypted form at the cloud server.

Even in a currently known implementation the security at a "device level", such as surrounding a computer memory comprised with a fingerprint system, will be in comparison higher then when storing fingerprint related data at a cloud server. The biggest problem surrounding remote storage of any form of data, including fingerprint related data, is the need for easy access to the data by the user, typically using an at least partly open network access connection such as the Internet. In comparison, in an embedded implementation of a fingerprint system, the computer memory may be closely combined with the fingerprint system, for example provided as a secure element. The secure element provides a much higher security level as compared to remote storage within e.g. a cloud server. However, even embedded devices may possibly be hacked.

Accordingly, there may in some alternative implementations, such as in a high security implementation, be desirable to not even store a complete fingerprint template locally within a computer memory comprised with the electronic fingerprint arrangement. Thus, in such an implementation the inventive concept may be used, i.e. separating the fingerprint data to basis features and a detailed set of related elements. As understood, only the detailed set of elements will be stored within the computer memory comprised with the electronic fingerprint arrangement.

In a possible embodiment of the present disclosure the first detailed set of elements is stored together with identity information for the finger of the user. As will be explained below, this may allow for a swift collection of the "correct" detailed set of elements to be used in a subsequent authentication process.

Within the context of the present disclosure, the expression "fingerprint data" should be interpreted broadly and to include both a regular "visual image" of a fingerprint of a finger as well as a set of measurements relating to the finger when acquired using the fingerprint sensor. A plurality of fingerprint images may be subsequently acquired and used together, where the resulting information is used as an input for determining fingerprint features.

Furthermore, it should be understood that the fingerprint sensor may be either of a fingerprint touch sensor and a swipe fingerprint sensor. The fingerprint sensor may be implemented using any kind of fingerprint sensing principle, including for example capacitive, ultrasonic, optical, or thermal sensing technology, or a combination thereof. However, at present capacitive sensing is most preferred. Both one and two-dimensional sensors are possible and within the scope of the present disclosure.

In addition, the expression "processing circuitry" as used above should be understood to include any type of computing device, such as an ASIC, a micro-processor, etc. It should also be understood that the actual implementation of such a processing circuitry may be divided between more than a single device/circuit.

According to a second aspect of the present disclosure, there is provided a method of authenticating a candidate fingerprint of a finger of a user by means of a fingerprint authentication system comprising a fingerprint sensor and processing circuitry connected to the fingerprint sensor, wherein the method comprises the steps of receiving, by said processing circuitry, an authentication request for the finger of the user, acquiring, by said processing circuitry, fingerprint data using the fingerprint sensor, determining, by said processing circuitry, a second plurality of fingerprint features of the finger from the fingerprint data, dividing, by said processing circuitry, the second plurality of fingerprint features into a second basis set of features and a second detailed set of elements related to the second basis set of features, and receiving from a computer memory, by said processing circuitry, a first detailed set of elements relating to the finger of the user, combining, by said processing circuitry, the second basis set of features with the first detailed set of elements, forming a third plurality of fingerprint features, comparing, by said processing circuitry, the second plurality of fingerprint features with the third plurality of fingerprint features, and providing, by said processing circuitry, an authentication signal indicative of a result of the comparison.

As briefly explained above, the inventive concept covers both the formation of a "two-part" fingerprint template and use of the same for authenticating a user. When using the two-part fingerprint template for authenticating a user, the process starts in a similar manner as explained above. However, for performing the actual authentication of the user, a comparison with pre-enrolled data is necessary. It should be understood that also identification of a user is within the scope of the present disclosure as will be further explained below.

In line with the discussion provided in relation to the first aspect of the present disclosure, the second aspect of the present disclosure may also in some embodiments comprise the step of receiving from the computer memory, by said processing circuitry, information relating to a feature transform key, wherein the second detailed set of elements at least partly are related to the second basis set of features based on the feature key. In a similar manner as discussed above, the feature transform key may be used for defining a model of how the (second) basis set of features are to relate to the (first) detailed set of elements. Accordingly, information relating to the feature transform key may thus in some embodiments be used for relating the basis of features to the detailed set of elements.

In accordance to the present disclosure, further fingerprint data is acquired using the fingerprint sensor. The further fingerprint data is provided as an input for determining a second plurality of fingerprint features, in turn divided into a second plurality of fingerprint features into a second basis set of features and a second detailed set of elements related to the second basis set of features.

For authenticating/identifying the user, the pre-enrolled first detailed set of elements is combined with the second basis set of features, forming a third plurality of fingerprint features. This information, i.e. the third plurality of fingerprint features, is then compared to the second plurality of fingerprint features. If there is a match (e.g. typically having a matching level above a threshold), the user is authenticated as the correct user.

Alternatively, a plurality of first detailed sets of elements may be combined with the second basis set of features, thereby allowing for the determination of which of the plurality of first detailed sets of elements is matching the second plurality of fingerprint features, whereby a user may be identified.

Accordingly, the inventive concept covers both the case where the user identifies himself and this information is used for acquiring a selected pre-enrolled first detailed set of elements, or where a plurality of pre-enrolled first detailed sets of elements are used in the matching process for identifying and authenticating the user. It should be understood that the expression "plurality of pre-enrolled first detailed sets of elements" may relate to only a small plurality of users/fingers, such as only including the persons employed by a company, the persons of a family, etc. However, the expression "plurality of pre-enrolled first detailed sets of elements" should also be understood to include the users populating a "global" database of users, i.e. being a large plurality of users.

An advantage following the possibility of not having to provide an identity for the user is that the present disclosure allows for high security also for applications where e.g. no user interface (e.g. graphical user interface, GUI) is provided with the fingerprint authentication system. Specifically, simple, small and secure electronic devices may be provided where only the touch of a finger onto a thereto provided fingerprint sensor is used for identifying and authenticating a specific user. Example of such devices includes any type of Internet of Things (IoT) device, such as a light switch providing user specific settings, a vehicle adaptable to user specific settings, etc. The possibilities are endless, still keeping a high security level for the user. The detailed description will provide some examples of how such simple, small and secure electronic devices may be implemented and used in line with the inventive concept. It should however be understood that the fingerprint authentication system may be implemented as a component of any form of electronic control system, for example including a smart phone, tablet, keyboard, computer mouse, smart card, laptop, etc.

According to a third aspect of the present disclosure, there is provided an electronic device, comprising a fingerprint sensor providing fingerprint data representing a finger of a user arranged at the fingerprint sensor, and processing circuitry connected to the fingerprint sensor, wherein the processing circuitry is configured to acquire fingerprint data of the finger using the fingerprint sensor, determine a first plurality of fingerprint features of the finger from the fingerprint data, divide the first plurality of fingerprint features into a first basis set of features and a first detailed set of elements related to the first basis set of features, wherein the first detailed set of elements are different from the first basis set of features, and provide the first detailed set of elements for storage within a computer memory. This aspect of the present disclosure provides similar advantages as discussed above in relation to the first aspect of the present disclosure.

According to a fourth aspect of the present disclosure, there is provided an electronic device, comprising a fingerprint sensor providing fingerprint data representing a finger of a user arranged at the fingerprint sensor, and processing circuitry connected to the fingerprint sensor, wherein the processing circuitry is configured to acquire fingerprint data using the fingerprint sensor, determine a second plurality of fingerprint features of the finger from the fingerprint data, divide the second plurality of fingerprint features into a second basis set of features and a second detailed set of elements related to the second basis set of features; and receive a first detailed set of elements relating to the finger of the user from a computer memory, combine the basis set of features with the first detailed set of elements, forming a third plurality of fingerprint features, compare the second plurality of fingerprint features with the third plurality of fingerprint features, and provide an authentication signal indicative of a result of the comparison. This aspect of the present disclosure provides similar advantages as discussed above in relation to the second aspect of the present disclosure.

In an embodiment, electronic device further comprises a transceiver connected to the processing circuitry and configured to establish a data connection to a further electronic arrangement comprising the computer memory and located separately from the electronic device, wherein the processing circuitry is further configured to establish connection to the further electronic arrangement for receiving the first detailed set of elements relating to the finger of the user.

In a possible embodiment, the electronic device does not comprise a display screen functioning as a user interface (UI), for example being a switch comprising the fingerprint sensor. The inventive concept will have great use in relation to such an embodiment as no instructions need to be given to the user for enrolling the user. Rather, the user may simply place his finger at the fingerprint sensor and e.g. the switch will perform the process of identifying/authenticating the user, even in a case where the user has not previously interacted with the switch. The switch/device must accordingly not necessarily be trained in regards to fingerprint interaction in an enrollment process; rather there is enough that the user provides his finger at the fingerprint sensor. It is thus expected that the switch will be in communication with typically the remote located computer memory for receiving the detailed set of elements for allowing the user to be identified/authenticated. Once the user has been identified/authenticated the switch may be used with specific possibly pre-allocated functions.

According to a fifth aspect of the present disclosure, there is provided a computer program product comprising a non-transitory computer readable medium having stored thereon computer program means for controlling an electronic device, the electronic device comprising a fingerprint sensor providing fingerprint data representing a finger of a user arranged at the fingerprint sensor, and processing circuitry connected to the fingerprint sensor, wherein the computer program product comprises code for acquiring fingerprint data of the finger using the fingerprint sensor, code for determining a first plurality of fingerprint features of the finger from the fingerprint data, code for dividing the first plurality of fingerprint features into a first basis set of features and a first detailed set of elements related to the first basis set of features, wherein the first detailed set of elements are different from the first basis set of features, and code for providing the first detailed set of elements for storage within a computer memory. Also this aspect of the present disclosure provides similar advantages as discussed above in relation to the first and third aspects of the present disclosure.

According to a sixth aspect of the present disclosure, there is provided a computer program product comprising a non-transitory computer readable medium having stored thereon computer program means for controlling an electronic device, the electronic device comprising a fingerprint sensor providing fingerprint data representing a finger of a user arranged at the fingerprint sensor, and processing circuitry connected to the fingerprint sensor wherein the computer program product comprises code for receiving an authentication request for the finger of the user, code for acquiring fingerprint data using the fingerprint sensor, code for determining a second plurality of fingerprint features of the finger from the fingerprint data, code for dividing the second plurality of fingerprint features into a second basis set of features and a second detailed set of elements related to the second basis set of features, and code for receiving a first detailed set of elements relating to the finger of the user from a computer memory, code for combining the basis set of features with the first detailed set of elements, forming a third plurality of fingerprint features, code for comparing the second plurality of fingerprint features with the third plurality of fingerprint features, and code for providing an authentication signal indicative of a result of the comparison. Also this aspect of the present disclosure provides similar advantages as discussed above in relation to the second and fourth aspects of the present disclosure.

In summary, the present disclosure generally relates to an improved method for use with an electronic fingerprint system, where the risk involved with remote storage of fingerprint related data is drastically reduced. The present disclosure provides a solution where a detailed set of elements relating to a fingerprint are separated from basis fingerprint features for the fingerprint, where the detailed set of elements are unusable without the basis fingerprint features. In accordance to the present disclosure, only the detailed set of elements is stored separately from the user.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout.

Figure 1A:
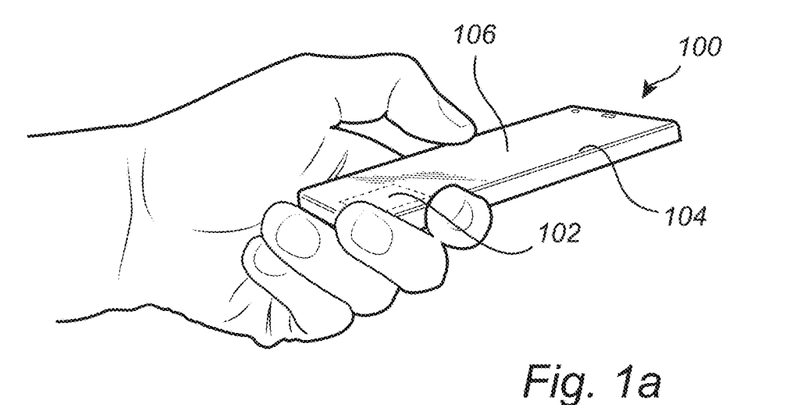
FIGS. 1a-1c schematically exemplifies electronic device according to different embodiments of the present disclosure.

Turning now to the drawings and to FIG. 1a in particular, there is schematically illustrated an example of an electronic device configured to apply the concept according to the present disclosure, in the form of a mobile phone 100 with an integrated fingerprint sensor 102 and a display unit 104 with a touch screen interface. In this embodiment the fingerprint sensor 102 is arranged on a side/edge of the mobile phone 100 and the display unit 104 is arranged at the front of the mobile phone 100. The fingerprint sensor 102 may, for example, be used for unlocking the mobile phone 100 and/or for authorizing transactions carried out using the mobile phone 100, etc. The fingerprint sensor 102 may of course also be placed on the back or the front side of the mobile phone 100.

Preferably and as is apparent for the skilled person, the mobile phone 100 shown in FIG. 1a further comprises a first antenna for WLAN/Wi-Fi communication, a second antenna for telecommunication communication, a microphone, a speaker, and a phone control unit. Further hardware elements are of course possibly comprised with the mobile phone.

Figure 1B:
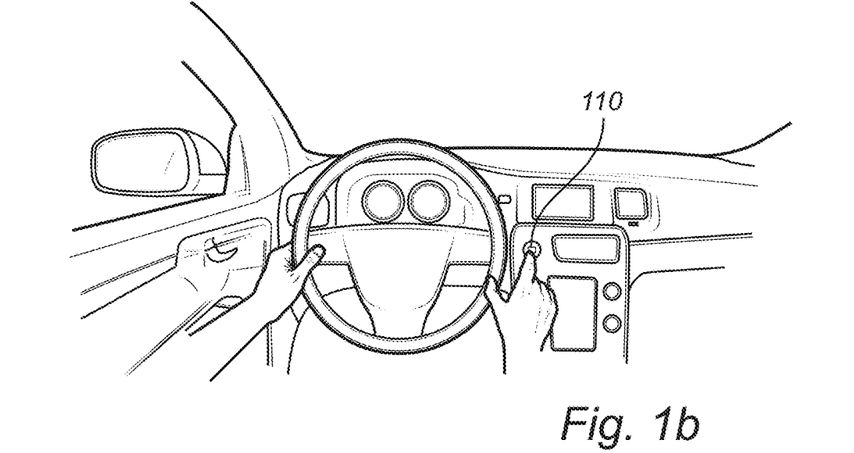
Figure 1C:
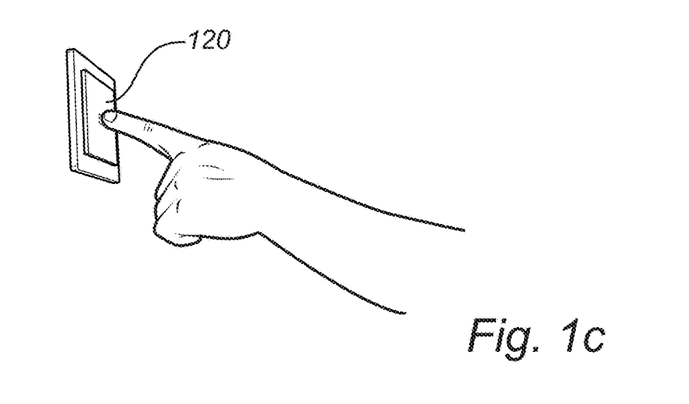

It should furthermore be noted that the present disclosure may be applicable in relation to any other type of electronic devices, such as a laptop, a remote control, a tablet computer, or any other type of present or future similarly configured device, including any type of IoT devices where there is a desire to allow for user specific settings and/or identification/authentication of a user to be implemented. FIGS. 1b and 1c illustrates to two such exemplary electronic devices.

Specifically, in FIG. 1b there is shown the interior of a vehicle, such as a car where e.g. a "start button" 110 is provided with a fingerprint sensor for allowing user access and specific settings for the users to be applied once the user has been identified/authenticated. The fingerprint sensor could of course also be arranged on the outside of the vehicle, thereby only allowing the correct user access to the interior of the vehicle.

Furthermore, FIG. 1c shows a switch 120 having an integrated fingerprint sensor. The switch 120 could for example be arranged to only allow the correct user to turn on/off the light or provide the user with user specific settings for the room where the switch 120 is arranged to control the light. It should be understood that the switch 120 must not necessarily be configured to control light. For example, the switch 120 may be arranged to control other features such as further equipment, including for example a computer/projector provided for showing a presentation, heating equipment, etc. The switch 120 could essentially be configured to control any type of equipment and the integrated fingerprint sensor and the functionality provided by means of the present disclosure will allow the control to be user specific.

In regards to all of the electronic devices as shown in FIGS. 1a-1c, there is comprised the fingerprint sensor 102 arranged in electrical communication with a processing circuitry adapted for controlling the fingerprint sensor 102. The processing circuitry may each include a microprocessor, microcontroller, programmable digital signal processor or another programmable device. The processing circuitry may also, or instead, each includes an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry (or generally discussed as "processing circuitry") may be at least partly integrated with the fingerprint sensor 102.

Figures 2, 3:
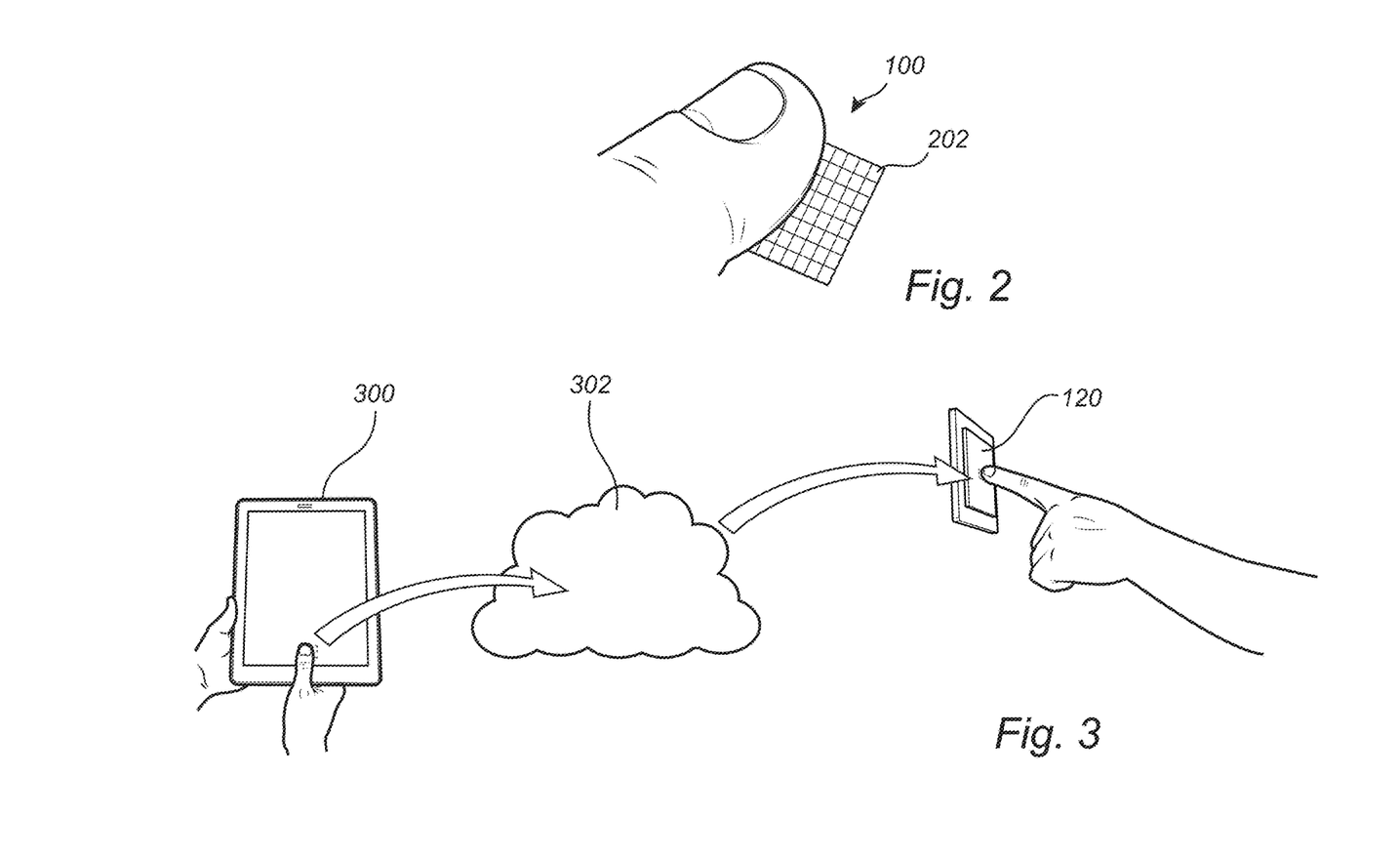
FIG. 2 schematically shows the fingerprint sensor array comprised in the portable electronic device in FIG. 1.
FIG. 3 conceptually illustrates an implementation where the inventive concept may be applied.

With further reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the present disclosure, including two-dimensional array with less pixels as compared to the above example. A single sensing element (also denoted as a pixel) is in FIG. 2 indicated by reference numeral 202.

One difference between the electronic devices as shown in FIGS. 1a-1c is that the switch 120 shown in FIG. 1c lacks a typical display screen to act as a user interface (UI) for the user operating the switch. Accordingly, the user may simply place his finger at the fingerprint sensor provided with the switch 120, and the switch 120 will perform the process of identifying/authenticating the user, even in a case where the user has not previously interacted with the switch 120. The switch 120 must accordingly not necessarily be trained in regards to fingerprint interaction in an enrollment process; rather there is enough that the user provides his finger at the fingerprint sensor. It is thus expected that the switch will be in communication with typically the remote located computer memory for receiving the detailed set of elements for allowing the user to be identified/authenticated. Once the user has been identified/authenticated the switch may be used with specific possibly pre-allocated functions. The pre-allocated functions could of course be any type of function from un-locking a door, allowing for starting a vehicle, turn on/off light, etc.

An exemplary embodiment where the inventive concept may be implemented, in relation to the switch 120 as shown in FIG. 1c is further illustrated in FIG. 3. In FIG. 3 an electronic device in the form of a tablet 300 is used for enrolling a finger of a user. In line with the enrollment process will be further elaborated below in relation to FIG. 4a-4c, the fingerprint is divided into basis fingerprint features and detailed elements being related to the fingerprint features. Only the detailed elements are stored within a computer memory, such as a computer memory comprised with a cloud server 302 in network communication with the tablet 300. The basis features are typically discarded; at least they are not communicated to the cloud server 302. In line with the above discussion, in some embodiments of the present disclosure a feature transform key may be stored together with or related to the detailed elements within the computer memory.

Once the user interacts with the switch 120, the switch will perform the identification/authentication process according to the present disclosure and as will be further elaborated below in relation to FIGS. 4a-4c. During the identification/authentication process, the detailed elements will be downloaded from the cloud server 302 to the switch 120.

Figure 4A:
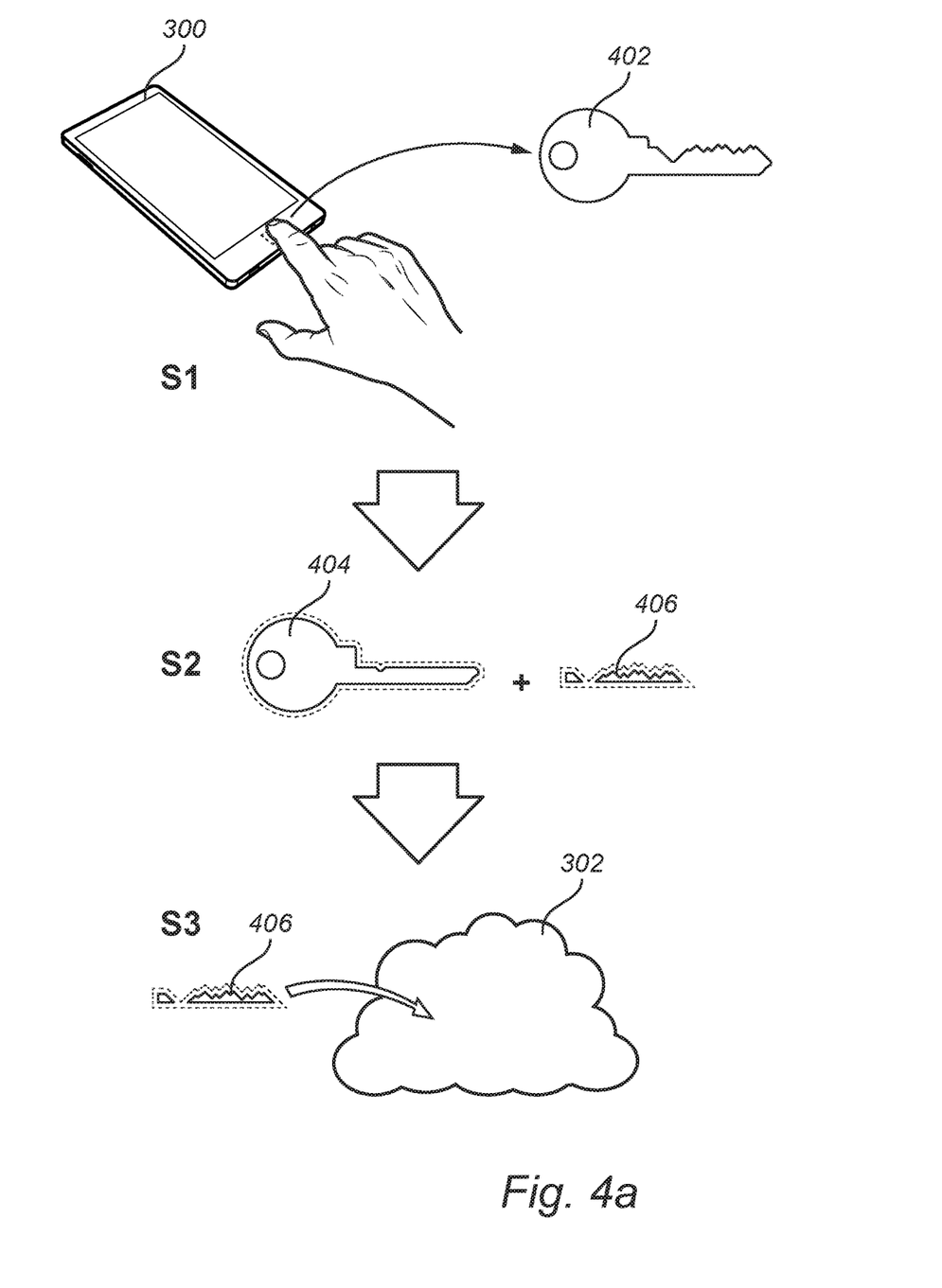
FIGS. 4a and 4c conceptually illustrate enrollment and verification in line with a preferred embodiment of the present disclosure.
Figure 5:
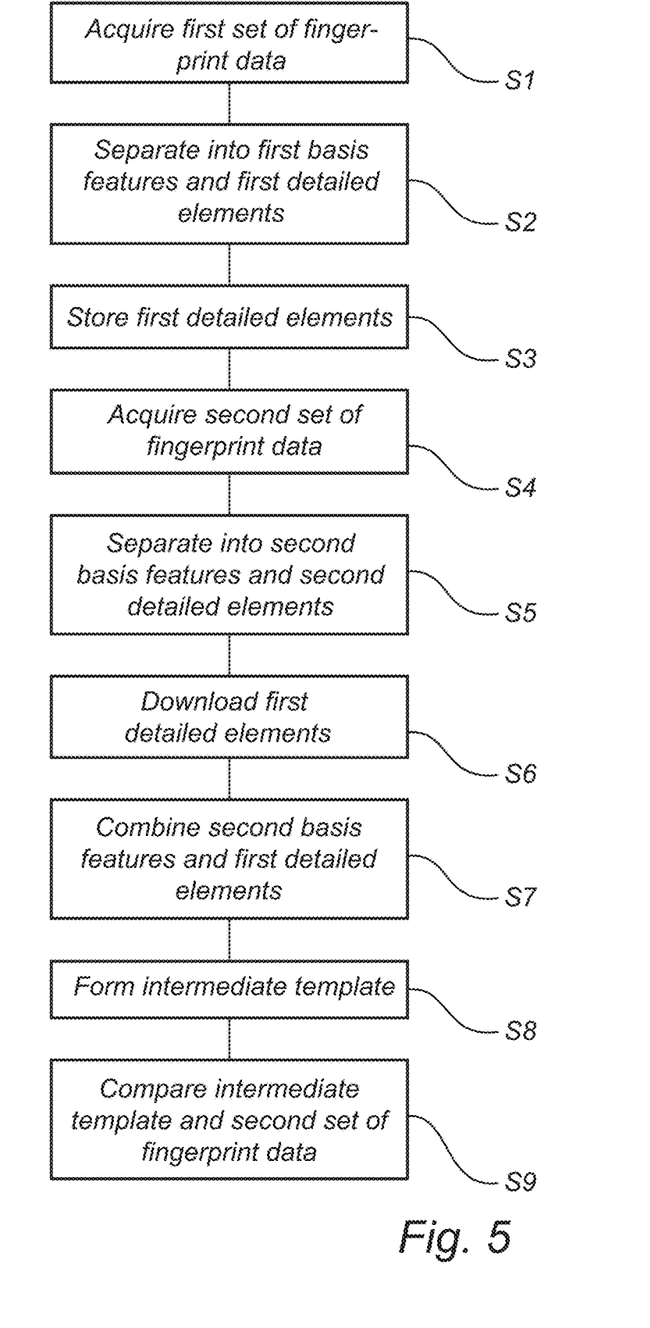
FIG. 5 is a flowchart disclosing the exemplary steps of the present disclosure as conceptually illustrated in FIGS. 4a and 4c.

FIG. 4a in conjunction with FIG. 5 is now provided for conceptually exemplifying how enrollment process may be implemented in line with the present disclosure. As a first step, the user is placing his finger adjacently or at the fingerprint sensor 102 comprised with e.g. his mobile phone 100, whereby the fingerprint sensor 102 will capture, S1, fingerprint data being a digital representation of the fingerprint of the user. For ease of understanding, the digital fingerprint of the fingerprint is illustrated as a unique "first key" 402, specific for the finger of the user.

Figure 4B:
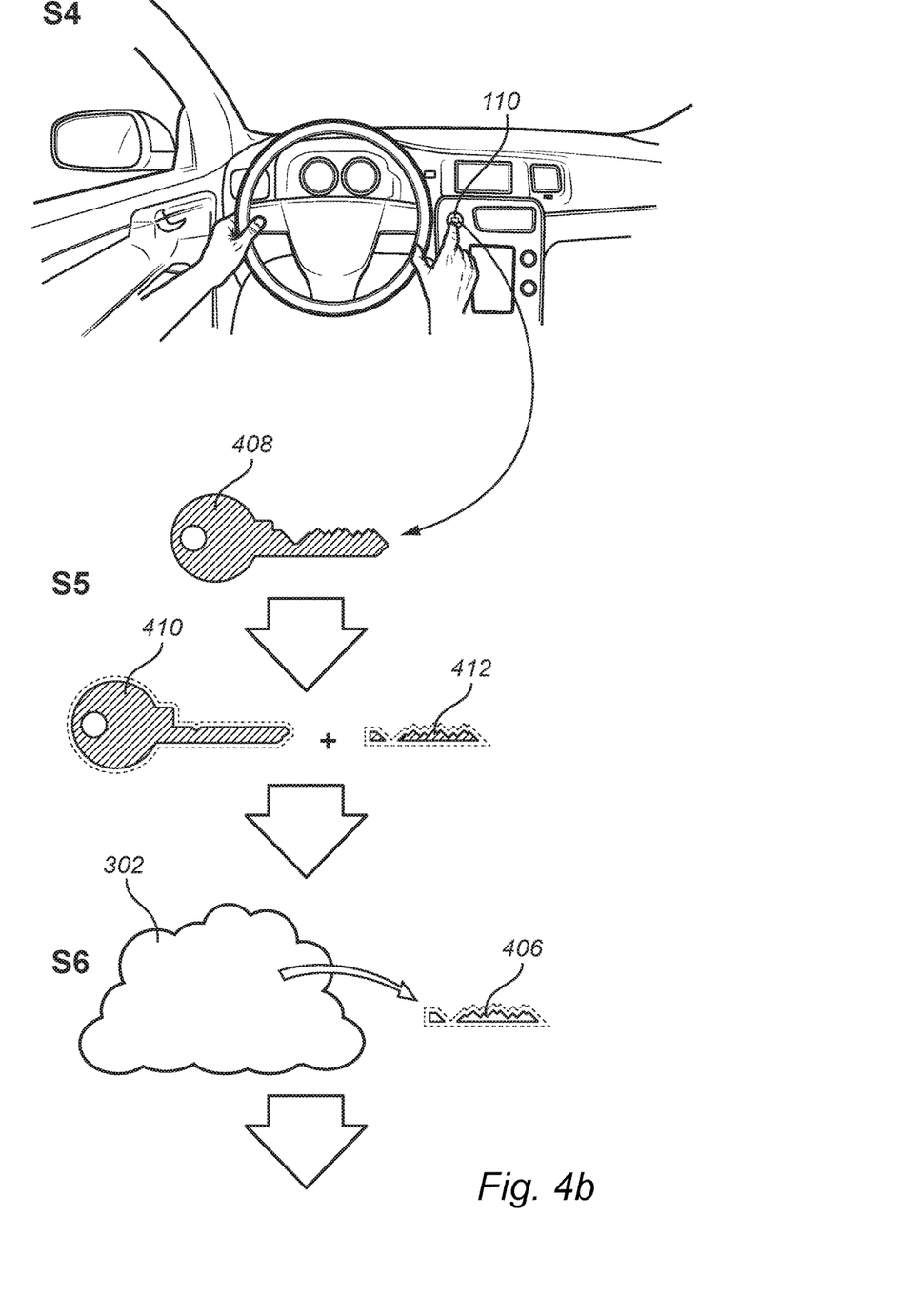

As illustrated in FIG. 4a and 4b, the digital representation of the fingerprint of the user is separated, S2, into basis features, illustrated as a first set of basis structure 404 of the first key 402, and a set of detailed elements, illustrated as "a first set of tips" 406 of the first key 402. As previously explained, the detailed elements, i.e. the first set of tips 406 are stored, S3, remotely within a computer memory of the cloud server 302. In an alternative embodiment of the present disclosure, the computer memory could be comprised with e.g. the mobile phone 100.

Figure 4C:
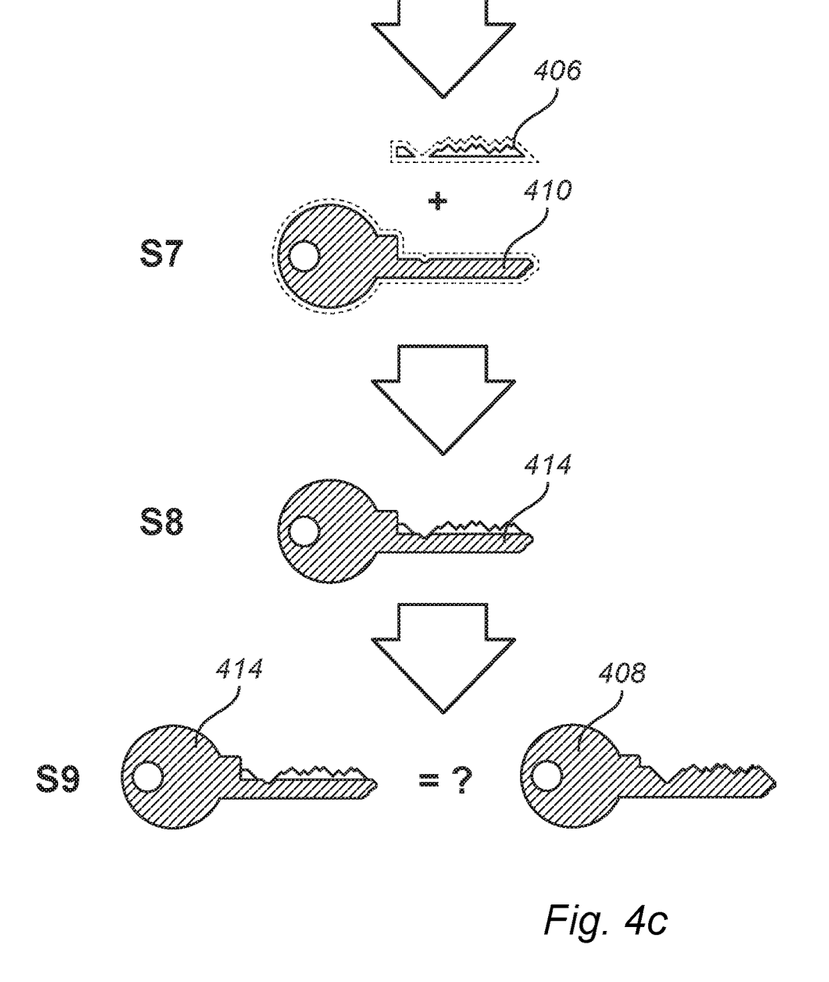

Turning next to FIGS. 4b-4c in conjunction with FIG. 5, conceptually illustrating the process of identifying/authenticating the user. In the illustration provided in FIGS. 4b-4c, the identification/authentication takes place at a fingerprint authentication system (being an electronic device) arranged within the previously illustrated car. As mentioned, the fingerprint sensor 102 may for example be arranged within a start button arranged within the interior of the car. The car could for example be a hired car, i.e. not previously occupied by the user.

In a prior-art situation, the user would first have to be verified as the correct user (for example by the operator of the car rental service) and only thereafter, as a second step, be allowed to enroll with the fingerprint authentication system. However, to assist the user in using the fingerprint authentication system without having to pass through the mentioned two steps, the inventive concept may be applied, by arranging the car to be in a network communication with the cloud server 302. Specifically, the user is placing his finger at the fingerprint sensor 102, whereby a digital representation of the fingerprint of the user is formed, S4, illustrated as a second key 408.

Again, the same or similar process of separating, S5, the second key 408 into a second set of basis structure 410 of the second key 408, and a second set of detailed elements, illustrated as a second set of tips 412 of the key 408. The fingerprint authentication system will as a next step download, S6, the first set of tips 406 from the cloud server 302 and combine, S7, the first set of tips 406 with the second set of basis structure 410, whereby an intermediate key 414 is formed, S8.

Any form of comparison suitable to be applied to fingerprint data may then be applied to compare, S9, the intermediate key 414 and the second key 408. In case the intermediate key 414 and the second key 408 are considered by the fingerprint authentication system to be similar, or at least having a matching level above a predetermined threshold, the fingerprint authentication system considers the user having "presented the second key 408" to be identified/authenticated. Following the identification/authentication, user specific setting may be applied to the car, for example including predefined radio stations, downloading a user specific phonebook, settings for the seat, billing for the car hire, etc. Of course, any further type of settings/information specific for the user may be provided following a successful identification/authentication.

Figure 6:
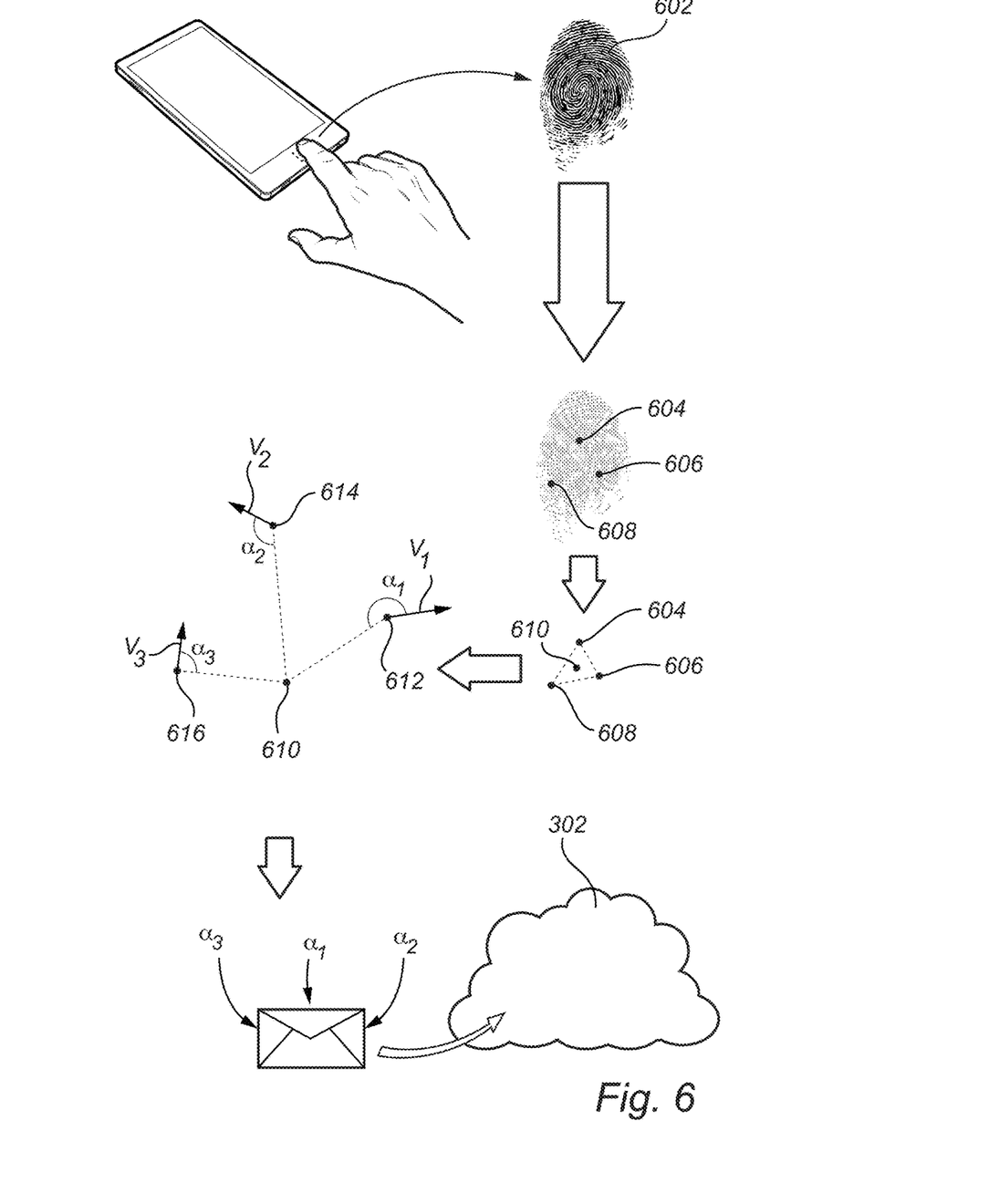
FIG. 6 shows an exemplifying illustration of fingerprint features being divided into basis features and detailed elements.

Turning finally to FIG. 6 providing a detailed exemplary implementation of the process of dividing fingerprint features, based on fingerprint data being a digital representation of a finger of a user, into basis features and detailed elements related to basis fingerprint features, wherein the detailed elements are different from the basis fingerprint features. As discussed above, the user places his finger at the fingerprint sensor 102, for example provided with his mobile phone 100, whereby the fingerprint sensor 102 will capture fingerprint data 602 being a digital representation of the fingerprint of the user.

The fingerprint data 602 is provided to and processed by the processing circuitry for extracting a plurality of fingerprint features being specific for the fingerprint of the finger of the user. In the illustration provided in FIG. 6, three key-points have been identified and defined as basis fingerprint features 604, 606, 608. The basis fingerprint features 604, 606, 608 are preferably easily identified fingerprint features for the specific finger of the user. In a possible implementation of the present disclosure, an origin 610, as a reference point, is selected in relation to the basis fingerprint features 604, 606, 608, for example being a "center of gravity" as compared to the basis fingerprint features 604, 606, 608.

In a surrounding of the basis features 604, 606, 608, there is as mentioned above further fingerprint data available. In line with the concept provided in accordance to the present disclosure, a plurality of detailed elements is selected from the fingerprint data. The detailed elements are different from the basis features 604, 606, 608. In FIG. 6, three detailed elements 612, 614, 616 have been selected. In FIG. 6 a dotted line is extending between the origin 610 and each of detailed elements 612, 614, 616.

Each of the detailed elements 612, 614, 616 may for example be defined by a vector, V, (for example being an intensity vector, depending on the selected implementation), where the vector, V, is extending in a direction having an angle, a, as compared to a direction of the dotted lines connecting each of the detailed elements 612, 614, 616 and the origin 610. The angle, a, will accordingly provide the required relation between each of the detailed elements 612, 614, 616 and the basis fingerprint features 604, 606, 608.

However, as the detailed elements do not contain any data of the chosen origin it is not possible to relate them to the fingerprint without the origin information formed by the basis features 604, 606, 608, thus not making the detailed elements 612, 614, 616 useful without the availability of the basis fingerprint features 604, 606, 608.

Following the separation of the fingerprint features into the basis features and the related detailed elements, the information relating to the detailed elements (are packaged in a suitable manner for allowing the information to be easily transferred and stored within a computer memory, such as related to the cloud server 302. The basis features are typically discarded and will not be uploaded to the cloud server 302. In a possible implementation of the present disclosure, only the angles, $\alpha_1$, $\alpha_2$, $\alpha_3$ for each of the detailed elements 612, 614, 616, respectively, are stored within the computer memory. In a further possible embodiment of the present disclosure, a descriptor of each of the detailed elements 612, 614, 618 may optionally be determined. The descriptor may be provided to relay further information relating to the specific detailed element.

In line with the above discussion relating to the feature transform key, in some embodiments the feature transform key may be seen as an "offset" to the selected origin 610. That is, rather than directly selecting the origin 610, an alternative "center point" may be selected that e.g. may be offset based on information relating to the feature transform key. Thus, in such a case the center point (i.e. previous origin 610) may possibly be "two-dimensionally moved", whereby the dotted line extending between the new center point and each of detailed elements 612, 614, 616 will be different. Accordingly, the angles, $\alpha_1$, $\alpha_2$, $\alpha_3$ for each of the detailed elements 612, 614, 616 will be different and dependent on the feature transform key. The center point may of course also be (only) moved in one dimension. Accordingly, the feature transform key may for example be a (e.g. at least partly randomly selected) positive or negative number.

When subsequently performing authentication of the candidate fingerprint, there will accordingly be a need to have knowledge of the feature transform key for correctly relate the downloaded detailed elements with the (newly captured) detailed features.

In the example provided, only three basis features 604, 606, 608 and three detailed elements 612, 614, 616 are shown. It should however be understood that any number of basis features and/or detailed elements may be determined and processed in a similar manner as mentioned above. In addition, the example for separation into basis features and detailed related elements are only one possible implementation provided solely for illustrative purpose. Generally, the desire is to select/optimize an algorithm to perform this process in such a manner that obvious and easily identified fingerprint features are selected as the basis features.

As discussed above, the detailed elements may then subsequently be downloaded from the cloud server 302 and combined with a subsequently determined set of basis features, typically based on fingerprint data acquired using a fingerprint sensor related to another electronic device, such as the above exemplified button 110 within the car, any type of IoT device such as for example the switch 120, etc.

The combination of the downloaded detailed elements and the subsequently determined set of basis features may be seen as an intermediate fingerprint template for the finger of the user that is then compared to the fingerprint data acquired using the fingerprint sensor of the e.g. the button 110/switch 120. In case the same finger is presented to the fingerprint sensor of the e.g. the button 110/switch 120, the above described algorithm will identify a similar set of basis features and detailed elements. Hence, a comparison will typically generate a match.

However, in case a different finger is presented to the fingerprint sensor of the e.g. the button 110/switch 120, the basis features will be different and hence a combination with the downloaded detailed elements will form an intermediate fingerprint template that will be different from the subsequently acquired fingerprint data. Accordingly, a comparison will not generate a match and the user will not be authenticated.

As indicated above, it is of course possible to download more than a single set of detailed elements. Accordingly, the authentication process may be iterated for a plurality of downloaded sets of detailed elements. The matching is to be performed for each of the plurality of downloaded sets of detailed elements, once a match is found this match is used for identify in the specific finger of the user. A database storing a plurality of sets of detailed elements may be formed for e.g. a family, an office, a government organization, etc. As the information within the database is useful without the knowledge of the basis features, the information is kept safe from any possible attacks by e.g. a hacker.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of authenticating a candidate fingerprint of a finger of a user by means of a fingerprint authentication system comprising a fingerprint sensor and processing circuitry connected to the fingerprint sensor, wherein the method comprises the steps of:
  receiving, by said processing circuitry, an authentication request for the finger of the user;
  acquiring, by said processing circuitry, fingerprint data using the fingerprint sensor;
  determining, by said processing circuitry, a second plurality of fingerprint features of the finger from the fingerprint data;
  dividing, by said processing circuitry, the second plurality of fingerprint features into a second basis set of features and a second detailed set of elements related to the second basis set of features; and
  receiving from a computer memory, by said processing circuitry, a first detailed set of elements relating to the finger of the user;
  combining, by said processing circuitry, the second basis set of features with the first detailed set of elements, forming a third plurality of fingerprint features;
  comparing, by said processing circuitry, the second plurality of fingerprint features with the third plurality of fingerprint features, and
  providing, by said processing circuitry, an authentication signal indicative of a result of the comparison.

2. The method according to claim 1, wherein the first detailed set of elements relating to the finger of the user is stored remotely from the fingerprint authentication system.

3. The method according to claim 1, wherein the step of receiving the first detailed set of elements comprises downloading the first detailed set of elements from a cloud computing device.

4. The method according to claim 1, wherein the fingerprint authentication system comprises the computer memory.

5. The method according to claim 1, wherein the step of receiving the first detailed set of elements comprises providing identity information for the finger of the user.

6. The method according to claim 1, wherein the step of receiving the first detailed set of elements comprises analyzing a plurality of first detailed set of elements for selecting one of the plurality of first detailed set of elements to be combined with the second basis set of features.

7. The method according to claim 1, wherein the fingerprint authentication system does not comprise a display screen functioning as a user interface.

8. An electronic device, comprising:
  a fingerprint sensor providing fingerprint data representing a finger of a user arranged at the fingerprint sensor; and
  processing circuitry connected to the fingerprint sensor, wherein the processing circuitry is configured to:
    acquire fingerprint data using the fingerprint sensor;
    determine a second plurality of fingerprint features of the finger from the fingerprint data;

divide the second plurality of fingerprint features into a second basis set of features and a second detailed set of elements related to the second basis set of features; and receive a first detailed set of elements relating to the finger of the user from a computer memory;

combine the second basis set of features with the first detailed set of elements, forming a third plurality of fingerprint features;

compare the second plurality of fingerprint features with the third plurality of fingerprint features, and provide an authentication signal indicative of a result of the comparison.

9. The electronic device according to claim 8, wherein the computer memory is comprised within a remotely located cloud server.

10. The electronic device according to claim 9, wherein the electronic device does not comprise a display screen functioning as a user interface.

11. The electronic device according to claim 8, wherein the electronic device comprises the computer memory.

12. The electronic device according to claim 8, further comprising a transceiver connected to the processing circuitry and configured to establish a data connection to a further electronic arrangement comprising the computer memory and located separately from the electronic device, wherein the processing circuitry is further configured to establish connection to the further electronic arrangement for receiving the first detailed set of elements relating to the finger of the user.

13. A computer program product comprising a non-transitory computer readable medium having stored thereon computer program means for controlling an electronic device, the electronic device comprising:

a fingerprint sensor providing fingerprint data representing a finger of a user arranged at the fingerprint sensor, and processing circuitry connected to the fingerprint sensor, wherein the computer program product comprises:

code for receiving an authentication request for the finger of the user;

code for acquiring fingerprint data using the fingerprint sensor;

code for determining a second plurality of fingerprint features of the finger from the fingerprint data;

code for dividing the second plurality of fingerprint features into a second basis set of features and a second detailed set of elements related to the second basis set of features; and code for receiving a first detailed set of elements relating to the finger of the user from a computer memory;

code for combining the second basis set of features with the first detailed set of elements, forming a third plurality of fingerprint features;

code for comparing the second plurality of fingerprint features with the third plurality of fingerprint features, and code for providing an authentication signal indicative of a result of the comparison.

* * * * *